(12) United States Patent
Lovel et al.

(10) Patent No.: US 11,505,639 B2
(45) Date of Patent: Nov. 22, 2022

(54) BLOCKED ISOCYANATE COMPOSITION

(71) Applicant: Huntsman International LLC, The Woodlands, TX (US)

(72) Inventors: Graig Gordon Lovel, Ivanhoe East (AU); David McDaid, Preston (AU); Travis Scott McCallum, Hoppers Crossing (AU); Shan Li Sheng, Taipei (TW); Cheng-Dar Liu, Taipei (TW)

(73) Assignee: Huntsman International LLC, The Woodlands, TX (US)

( * ) Notice: Subject to any disclaimer, the term of this patent is extended or adjusted under 35 U.S.C. 154(b) by 405 days.

(21) Appl. No.: 16/305,905

(22) PCT Filed: May 31, 2017

(86) PCT No.: PCT/US2017/035089
§ 371 (c)(1),
(2) Date: Nov. 30, 2018

(87) PCT Pub. No.: WO2017/210234
PCT Pub. Date: Dec. 7, 2017

(65) Prior Publication Data
US 2020/0407483 A1    Dec. 31, 2020

(30) Foreign Application Priority Data

Jun. 3, 2016   (EP) .................................... 16172876

(51) Int. Cl.
*C08G 18/08*      (2006.01)
*C08G 18/80*      (2006.01)
(Continued)

(52) U.S. Cl.
CPC ......... *C08G 18/4833* (2013.01); *C08G 18/10* (2013.01); *C08G 18/283* (2013.01);
(Continued)

(58) Field of Classification Search
CPC .......................... C08G 18/8064; C08G 18/808
See application file for complete search history.

(56) References Cited

U.S. PATENT DOCUMENTS 4,976,837 A  *  12/1990  Hughes ................ C07D 231/12
                                                        106/287.2
5,210,169 A  *   5/1993  Muhlebach ........ C08G 18/3225
                                                        528/45
(Continued)

FOREIGN PATENT DOCUMENTS

EP        0234148 A1     9/1987
EP        1068254        10/1999
(Continued)

*Primary Examiner* — Michael L Leonard
(74) *Attorney, Agent, or Firm* — Huntsman International LLC; Lewis Craft

(57) ABSTRACT

This invention generally provides blocked isocyanate compositions and more specially blocked isocyanate compositions useful in aminoplastic resins, phenoplastic resins or latex resins for composite wood products, wherein the blocked isocyanate composition is obtained by adding alkylene carbonate to a blocked isocyanate (A), wherein the blocked isocyanate (A) is obtained by reacting a secondary amine (a1) with a reaction product (a2) of a polyfunctional isocyanate and a monofunctional hydroxyl containing compound, wherein the monofunctional hydroxyl containing compound is a polyethylene oxide polymer with terminal hydroxyl group, polyoxyethylene-polyoxypropylene monols or a mixture thereof, wherein the portion of blocked isocyanate (A) by weight percentage of the blocked isocyanate composition is between 50 and 90, preferably between 60 and 80. The compositions are stable at room temperature when mixed with active hydrogen containing compounds. The composition has low visicosity and after de-block has the potential to reduce free formaldehyde levels in formaldehyde containing resins.

16 Claims, 1 Drawing Sheet

(51) Int. Cl.
  *C08G 18/48*  (2006.01)
  *C08G 18/10*  (2006.01)
  *C08G 18/28*  (2006.01)
  *C08G 18/76*  (2006.01)

(52) U.S. Cl.
  CPC ..... *C08G 18/2865* (2013.01); *C08G 18/7664* (2013.01); *C08G 18/808* (2013.01); *C08G 18/8064* (2013.01)

(56) References Cited

U.S. PATENT DOCUMENTS

| | | | | |
|---|---|---|---|---|
| 5,736,193 | A * | 4/1998 | Schink | C08K 5/1565 427/117 |
| 6,387,187 | B2 * | 5/2002 | Yavorsky | C08G 18/0852 510/109 |
| 6,437,077 | B1 | 8/2002 | Danner | |
| 6,451,963 | B1 | 9/2002 | Langel et al. | |
| 6,559,264 | B1 | 5/2003 | Konig et al. | |
| 7,074,852 | B2 * | 7/2006 | Mazanek | C08G 18/0823 252/182.2 |
| 7,220,814 | B2 | 5/2007 | Rische et al. | |
| 2003/0045631 | A1 * | 3/2003 | Konig | C08G 18/3275 252/182.13 |
| 2015/0322292 | A1 * | 11/2015 | Pierce | C09D 175/04 427/385.5 |
| 2016/0200858 | A1 * | 7/2016 | Fukuda | C08G 18/285 540/531 |

FOREIGN PATENT DOCUMENTS

| | | |
|---|---|---|
| KR | 100391247 B1 | 2/2003 |
| WO | WO2002/050152 A1 | 6/2002 |

* cited by examiner

BLOCKED ISOCYANATE COMPOSITION

CROSS-REFERENCE TO RELATED APPLICATIONS

This application claims priority to PCT Application No. PCT/US2017/035089 filed May 31, 2017 and European Patent Application Number 16172876.1, which was filed Jun. 3, 2016. The noted applications are incorporated herein by reference.

FIELD OF THE INVENTION

This invention relates generally to blocked isocyanate composition and more specially to blocked isocyanate composition useful in crosslinking water based resins such as aminoplastic resins or phenoplastic resins for binding composite wood products.

BACKGROUND INFORMATION

In order to store the isocyanates with active hydrogen containing compounds such as water, latex, amino resins or phenolic resins, the reactive groups of isocyanates need to be blocked. The blocked isocyanates are able to dissociate at elevated temperatures and consequently re-generate isocyanate reactive groups for subsequent reactions to form thermally stable urethane or urea bonds. Methods of preparing blocked isocyanates are already known in the art. However, known solutions were not able to provide a blocked isocyanates which can disperse well in water or resins to achieve a low viscosity composition for further process. Therefore, it would be desirable to develop a blocked emulsifiable isocyanate composition to address the problem.

In the prior art, U.S. Pat. Nos. 6,451,963 and 6,559,264 discloses blocked polyisocyanate cross-linking agents used in varnishes. But the viscosity of the compositions is very high. KR100391247, WO200250152, and EP0234148 disclose the use of blocked polyisocyanate compositions in the wood composite products. But the blocking agents used in those prior art are different from the present invention.

U.S. Pat. No. 7,220,814 discloses a hydrophilized blocked polyisocyanate. But the mono-functional hydroxyl containing compound used in this patent is different from the present invention.

After a thorough prior art study, it is found that none of the documents cited above teaches or suggests the present invention.

SUMMARY OF THE INVENTION

It has now been surprisingly found that the compositions and processes of the present invention address the above problem. Advantages of the present invention may include: (1) stable at room temperature when mixed with active hydrogen containing compounds; (2) low emulsified viscosity; and (3) potentially reduced formaldehyde after de-block, when combined with formaldehyde containing resins.

The present invention is concerned with blocked isocyanate compositions and processes for preparing these compositions. In one embodiment, the invention provides a blocked isocyanate composition obtained by adding alkylene carbonate to a blocked isocyanate (A), wherein the blocked isocyanate (A) is obtained by reacting a secondary amine (a1) with a reaction product (a2) of a polyfunctional isocyanate and a monofunctional hydroxyl containing compound, wherein the monofunctional hydroxyl containing compound is a polyethylene oxide polymer with terminal hydroxyl group, polyoxyethylene-polyoxypropylene monols or a mixture thereof, wherein the portion of blocked isocyanate (A) by weight percentage of the blocked isocyanate composition is between 50 and 90, preferably between 60 and 80.

In another embodiment, the present invention provides a process for preparation of the blocked isocyanate composition of the invention.

In still another embodiment, the present invention provides the use of the blocked isocyanate compositions in aminoplastic resins or phenoplastic resins for composite wood products.

DETAILED DESCRIPTION

Figure 1:
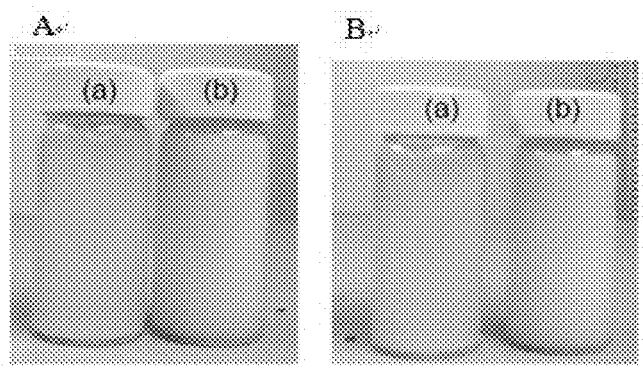
FIG. 1A shows 6.25 wt % (based on the solution) of the inventive composition of Example 1 mixed in water (bottle (a)) and in UF resin (bottle (b)).
FIG. 1B shows the solutions after being kept for 24 hours at room temperature.
Figure 2:
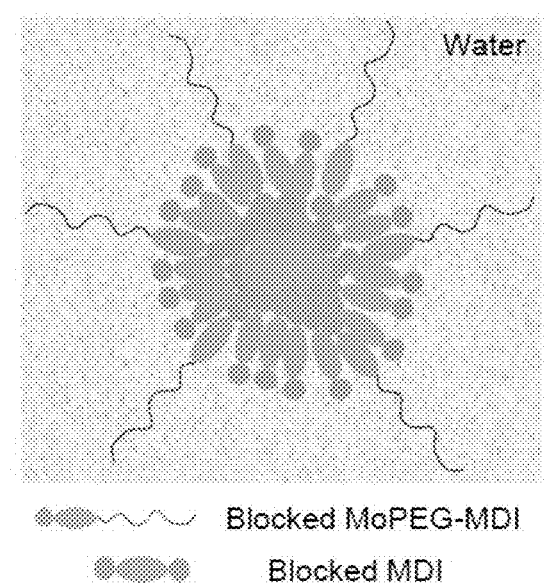
FIG. 2 demonstrates a scheme of the compositions with and without modified by Methoxypolyethylene Glycol (MOPEG) (Example 4 and 5). MOPEG has a hydrophilic ether group which makes the inventive compositions easier to be emulsified in water.

If appearing herein, the term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical object of the article. By way of example, "a resin" means one resin or more than one resin.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The present invention generally provides a blocked isocyanate composition obtained by adding alkylene carbonate to a blocked isocyanate (A), wherein the blocked isocyanate (A) is obtained by reacting a secondary amine (a1) with a reaction product (a2) of a polyfunctional isocyanate and a monofunctional hydroxyl containing compound, wherein the monofunctional hydroxyl containing compound (hereinafter referred to under the term "monol" for sake of convenience) is a polyethylene oxide polymer with terminal hydroxyl group, polyoxyethylene-polyoxypropylene monols or a mixture thereof, wherein the portion of blocked isocyanate (A) by weight percentage of the blocked isocyanate composition is between 50 and 90, preferably between 60 and 80.

According to one embodiment, the polyfunctional isocyanate includes those represented by the formula $Q(NCO)_n$ where n is a number from 2-5, preferably 2-3 and Q is an aliphatic hydrocarbon group containing 2-18 carbon atoms, a cycloaliphatic hydrocarbon group containing 5-10 carbon atoms, an araliphatic hydrocarbon group containing 8-13 carbon atoms, or an aromatic hydrocarbon group containing 6-15 carbon atoms, wherein aromatic hydrocarbon groups are in general preferred.

Examples of polyfunctional isocyanates include, but are not limited to, ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; isophorone diisocyanate; 2,4- and 2,6-hexahydrotoluene diisocyanate and mixtures of these isomers; dicyclohexylmethane-4,4'-diisocyanate (hydrogenated MDI or HMDI); 1,3- and 1,4-phenylene diisocyanate; 2,4- and 2,6-toluene diisocyanate and mixtures of these isomers (TDI); diphenylmethane-2,4'- and/or -4,4'-diisocyanate (MDI); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation (polymeric MDI); norbornane diisocyanates; m- and p-isocyanatophenyl sulfonylisocyanates; perchlorinated aryl polyisocyanates; modified polyfunctional isocyanates containing carbodiimide groups, urethane groups, allophonate groups, isocyanurate groups, urea groups, or biruret groups; polyfunctional isocyanates obtained by telomerization reactions; polyfunctional isocyanates containing ester groups; and polyfunctional isocyanates containing polymeric fatty acid groups. Those skilled in the art will recognize that it is also possible to use mixtures of the polyfunctional isocyanates described above, preferably using mixture of polymeric MDI and mixture of MDI isomers, more preferably using polymeric MDI.

In another embodiment, prepolymers of MDI can also be used as an alternative of MDI. Prepolymers of MDI are prepared by the reaction of an MDI and a polyfunctional polyol. The synthesis processes of prepolymers of MDI are known in the art (see for example Polyurethanes Handbook $2^{nd}$ edition, G. Oertel, 1994).

The invention may allow controlling the hydrophilicity of the blocked isocyanate composition of the present invention, by changing the amount of monol which helps to emulsify the blocked isocyanate composition in water, amino resins or phenolic resins.

In one embodiment, the monofunctional hydroxyl containing compound is a polyethylene oxide polymer with terminal hydroxyl group, polyoxyethylene-polyoxypropylene monols or a mixture thereof, preferably Methoxypolyethylene Glycol (MOPEG). The molecular weight of the monol may be between 100 and 10,000, preferably between 200 and 5,000, more preferably between 300 and 1,000. Molecular weight (MW) is weight average molecular weight which is defined by Gel Permeation Chromatography (GPC) method with polystyrene as a reference.

In still another embodiment, the monol proportion by weight percentage of the reaction product (a2) is between 1 and 90, preferably between 3 and 60, more preferably between 40 and 50.

According to one embodiment, the NCO/OH ratio of isocyanate groups present in the blocked isocyanate composition to hydroxyl groups present in the blocked isocyanate composition is between 20:1 and 2:1, preferably between 8:1 and 2:1.

The NCO content of the blocked isocyanate composition of the present invention is generally between 5 and 18 wt %, preferably between 10 and 16 wt %.

It is found that using alkylene carbonate as solvent can reduce viscosity of the resin, help the blocked isocyanate emulsify in water and other water containing resins and also act as a blocking agent capture compound in the deblocking process. In one embodiment, the alkylene carbonate is propylene carbonate, or butyl carbonate. The portion of alkylene carbonate by weight percentage of the blocked isocyanate composition is between 10 and 50, preferably between 20 and 40.

In another embodiment, the secondary amine (a1) is a secondary amine with one or two nitrogen atoms, preferably is diisopropylamine, dimethylpyrazole or a mixture thereof.

In still another embodiment, the molar ratio of the reaction product (a2) to the secondary amine (a1) is between 0.3 and 30, preferably between 0.3 and 10.

In the present invention, the composition may further include one or more catalysts in order to reduce the deblocking temperature of blocked isocyanate composition, for example, tin compound, such as a tin salt of a carboxylic acid, e.g. dibutyltin dilaurate, stannous acetate and stannous octoate; amines, e.g. dimethylcyclohexylamine and triethylene diamine; bismuth carboxylates, bismuth and zinc carboxylate mixture.

In one embodiment, the proportion of the catalysts present in the composition is of between 0.1 and 10 wt %, preferably between 0.2 and 2 wt %.

Advantages of the inventive composition may include: (1) stable at room temperature when mixed with active hydrogen containing compounds; (2) low viscosity; (3) emulsifiable in water or other water containing resins, (4) extended potlife, (5) lower de-blocking temperation and (6) potentially reduced formaldehyde after de-block, when combined with formaldehyde containing resins.

The present invention also provides a process for preparation of the blocked isocyanate composition, comprising adding alkylene carbonate and optionally at least one catalyst to a blocked isocyanate (A). Alkylene carbonate can be added before or after the blocking reaction.

The blocked isocyanate (A) is prepared by reacting a secondary amine (a1) with a reaction product (a2) of a polyfunctional isocyanate and a monol, wherein the portion of blocked isocyanate (A) by weight percentage of the blocked isocyanate composition is between 50 and 90, preferably between 60 and 80.

Furthermore, the present invention also provides the use of the blocked isocyanate compositions in aminoplastic resins or phenoplastic resins for composite wood products.

It can also be applied to other aqueous system such as polyvinyl alcohol (PVA), PU dispersions (PUD) or ethylene-vinyl acetate (EVA) latex systems. It can also be used as a component in conventional MDI based preparations, either polymeric MDI (PMDI) or emulsifiable PMDI to provide a two stage curing process.

In one embodiment, the aminoplastic resins are melamine urea formaldehyde (MUF) resins or urea formaldehyde (UF)

resins. There are quite a lot benefits of adding the inventive compositions in aminoplastic resins. For example, decreasing gelation time and reducing melamine. It may also be found that after de-blocking, secondary amine may react with free formaldehyde and hence reduce formaldehyde levels.

In another embodiment, the inventive composition is mixed with aminoplastic resin at a portion by weight percentage of between 10 and 50, preferably between 20 and 40. The panel results demonstrate that there is better effect on the durability of the wood panels when the mixed aminoplastic resin is applied on the panels. It is shown that with the addition of the inventive composition there was a reduction in swell and an increase in the modulus of rupture, when compared to just using aminoplastic resin alone.

The examples which now follow should be considered exemplary of the present invention, and not delimitive thereof in any way.

Raw Materials

Isocyanate A: SUPRASEC® 5005 (polymeric MDI). Supplier: Huntsman, USA;
Isocyanate B: SUPRASEC® 3051 (mixture of MDI isomers). Supplier: Huntsman, USA;
Polyol: a bifunctional ethylene glycol based polyether polyol; has a molecular weight around 1,000;
Monol A: a polyethylene oxide polymer with terminal hydroxyl group with molecular weight around 500;
Monol B: a polyethylene oxide polymer with terminal hydroxyl group with molecular weight around 750;
DIPA: diisopropylamine
Caprolectam: blocking agent has higher de-blocking temperature than DIPA
PC: propylene carbonate
T12: dibutyltin dilaurate

Example 1

Formulation
25.25 parts by weight Monol A
34.21 parts by weight Isocyanate A
20.53 parts by weight DIPA
20 parts by weight PC
Procedure Monol A was dried at 100° C. under vacuum for 2~3 hours to have a water content of below 400 ppm. Monol A and isocyanate A were mixed in the proportions indicated above and stirred in a closed cup at 60° C. for 1.5 hours to obtain an isocyanate prepolymer composition. Then DIPA and PC were charged to obtain the blocked isocyanate composition.

Example 2

Formulation
23.67 parts by weight Monol A
32.08 parts by weight Isocyanate A
19.25 parts by weight DIPA
25 parts by weight PC
Procedure Monol A was dried at 100° C. under vacuum for 2~3 hours to have a water content of below 400 ppm. Monol A and isocyanate A were mixed in the proportions indicated above and stirred in a closed cup at 60° C. for 1.5 hours to obtain an isocyanate prepolymer composition. Then DIPA and PC were charged to obtain the blocked isocyanate composition.

Example 3

Formulation
22.10 parts by weight Monol A
29.94 parts by weight Isocyanate A
17.96 parts by weight DIPA
30 parts by weight PC
Procedure Monol A was dried at 100° C. under vacuum for 2~3 hours to have a water content of below 400 ppm. Monol A and isocyanate A were mixed in the proportions indicated above and stirred in a closed cup at 60° C. for 1.5 hours to obtain an isocyanate prepolymer composition. Then DIPA and PC were charged to obtain the blocked isocyanate composition.

Results

TABLE 1

| Example | Ex 1 | Ex 2 | Ex 3 |
| --- | --- | --- | --- |
| Active NCO[1] (after de-blocking) | 8.62 wt % | 7.99 wt % | 7.45 wt % |
| Viscosity[2] [cps] (before de-blocking) | 50,000 | 20,000 | 4,000-5,000 |

[1]Theoretical calculation
[2]Viscosity: measured by Brookfield Digital Viscometer at 25° C. and normal pressure when humidity is 50%.

The resulting samples with different viscosities and active NCO content can be used in different applications. Resulting samples can be well emulsified in water or in a urea formaldehyde (UF) resin (FIGS. 1A and 1B). The samples are stable at room temperature for at least one week. With an addition of 1 wt % T12 catalyst the samples start to de-block at about 50° C. and full dissociation of the blocked isocyanate occurs within 10 minutes at 120° C. Upon de-blocking, the samples generates active NCO groups as shown in Table 1.

Example 4

Formulation
23.57 parts by weight Monol B
31.25 parts by weight Isocyanate A
20.18 parts by weight DIPA
25 parts by weight PC
Procedure Monol B was dried at 100° C. under vacuum for 2~3 hours to have a water content of below 400 ppm. Monol B and Isocyanate A were mixed in the proportions indicated above and stirred in a closed cup at 60° C. for 1.5 hours to obtain an isocyanate prepolymer composition. Then DIPA and PC were charged to obtain the blocked isocyanate composition.

Example 5

Formulation
22.98 parts by weight Monol B
30.47 parts by weight Isocyanate B
21.55 parts by weight DIPA
25 parts by weight PC
Procedure Monol B was dried at 100° C. under vacuum for 2~3 hours to have a water content of below 400 ppm. Monol B and Isocyanate B were mixed in the proportions indicated above and stirred in a closed cup at 60° C. for 1.5 hours to obtain an isocyanate prepolymer composition. Then DIPA and PC were charged to obtain the blocked isocyanate composition.

This example is a comparative example.

Example 6

Formulation
22.85 parts by weight Monol B 30.30 parts by weight Isocyanate A
21.85 parts by weight Caprolactam
25 parts by weight PC
Procedure Monol B and Caprolectam were dried at 100° C. under vacuum for 2~3 hours to have a water content of below 400 ppm. Monol B and Isocyanate A were mixed in the proportions indicated above and stirred in a closed cup at 60° C. for 1.5 hours to obtain an isocyanate prepolymer composition. Then Caprolectam and PC were charged to obtain the blocked isocyanate composition.

This example is a comparative example.

Example 7

Formulation
24.06 parts by weight Polyol
31.90 parts by weight Isocyanate A
19.04 parts by weight DIPA
25 parts by weight PC
Procedure Polyol was dried at 100° C. under vacuum for 2~3 hours to have a water content of below 400 ppm. Polyol and Isocyanate A were mixed in the proportions indicated above and stirred in a closed cup at 60° C. for 1.5 hours to obtain an isocyanate prepolymer composition. Then DIPA and PC were charged to obtain the blocked isocyanate composition.

This example is a comparative example.

Example 8

Formulation
42.93 parts by weight Isocyanate A
32.07 parts by weight DIPA
25 parts by weight PC
Procedure Sup5005 was stirred in a closed cup at 60° C. for 1.5 hours. Then DIPA and PC were charged to obtain the blocked isocyanate composition.

This example is a comparative example.

Results

Figure 3:
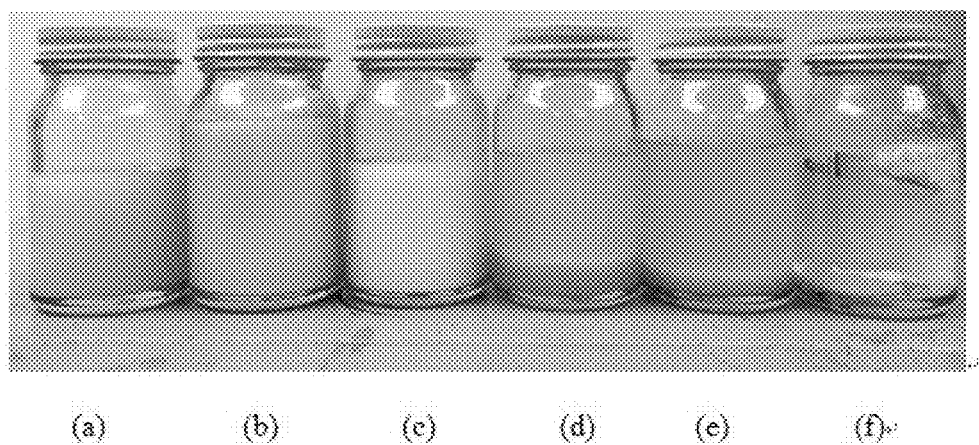
FIG. 3 shows 5 wt % (based on the solution) of the compositions of Example 4-8 mixed in water.

Sample of Example 4 (FIG. 3 (a)) could be diluted by water to 5~50 wt % and maintain stable emulsion over 1 month (FIG. 3 (b)).

Sample of Example 5 is diluted by water to 5 wt % (FIG. 3 (c)). It can be emulsified in water but its solubility in water is not as good as sample of Example 4. A bit of white precipitate is shown in aqueous emulsion.

Sample of Example 6 is diluted by water to 5 wt % (FIG. 3 (d)). Its solubility in water is very poor. Some white precipitate is shown in aqueous emulsion.

Sample of Example 7 is diluted by water to 5 wt % (FIG. 3 (e)). Its solubility in water is poor. This is because the sample had two hydrophobic tails.

Sample of Example 8 could not be dissolved or emulsified in water (FIG. 3 (f)).

What is claimed is:

1. A blocked isocyanate composition obtained by adding 20-40% by weight, based on the total weight of the blocked isocyanate composition, alkylene carbonate to a blocked isocyanate (A), wherein the blocked isocyanate (A) is the reaction product of a composition consisting of a secondary amine having one nitrogen atom (a1) and the reaction product (a2) of a precursor composition consisting of a polyfunctional isocyanate and a monofunctional hydroxyl containing compound, wherein the monofunctional hydroxyl containing compound is a polyethylene oxide polymer with a terminal hydroxyl group, polyoxyethylene-polyoxypropylene monols or a mixture thereof, wherein the proportion of blocked isocyanate (A) by weight percentage of the blocked isocyanate composition is between 50 and 90, wherein the proportion of the monofunctional hydroxyl containing compound by weight percentage of the reaction product (a2) is between 40 and 90.

2. The blocked isocyanate composition of claim 1 wherein the polyfunctional isocyanate is a polymeric MDI or an MDI isomer mixture or a mixture thereof.

3. The blocked isocyanate composition of claim 1 wherein the weight average molecular weight of the monofunctional hydroxyl containing compound is between 100 and 10,000.

4. The blocked isocyanate composition of claim 1 wherein the proportion of the monofunctional hydroxyl containing compound by weight percentage of the reaction product (a2) is between 40 and 60.

5. The blocked isocyanate composition of claim 1 wherein the alkylene carbonate is propylene carbonate.

6. The blocked isocyanate composition of claim 1 wherein the secondary amine (a1) is diisopropylamine.

7. The blocked isocyanate composition of claim 1 wherein the molar ratio of the reaction product (a2) to the secondary amine (a1) is between 0.3 and 30.

8. The blocked isocyanate composition of claim 1 further contains at least one catalyst.

9. A method for preparing a blocked isocyanate composition comprising adding 20-40% by weight, based on the total weight of the blocked isocyanate composition, alkylene carbonate and, optionally, at least one catalyst to a blocked isocyanate (A), wherein the blocked isocyanate (A) is obtained by reacting a composition consisting of a secondary amine having one nitrogen atom (a1) with a reaction product (a2) of a precursor composition consisting of a polyfunctional isocyanate and a monofunctional hydroxyl containing compound, wherein the monofunctional hydroxyl containing compound is a polyethylene oxide polymer with terminal hydroxyl group, polyoxyethylene-polyoxypropylene monols or a mixture thereof, wherein the proportion of blocked isocyanate (A) by weight percentage of the blocked isocyanate composition is between 50 and 90, wherein the proportion of the monofunctional hydroxyl containing compound by weight percentage of the reaction product (a2) is between 40 and 90; and wherein the step of forming the reaction product (a2) is conducted prior to reacting the secondary amine having one nitrogen atom (a1) to the reaction product.

10. The method according to claim 9 wherein the polyfunctional isocyanate is a polymeric MDI or an MDI isomer mixture or a mixture thereof.

11. The method according to claim 9 wherein the weight average molecular weight of the monofunctional hydroxyl containing compound is between 100 and 10,000.

12. The method according to claim 9 wherein the proportion of the monofunctional hydroxyl containing compound by weight percentage of the reaction product (a2) is between 40 and 60.

13. The method according to claim 9 wherein the alkylene carbonate is propylene carbonate.

14. The method according to claim 9 wherein the secondary amine (a1) is diisopropylamine.

15. The method according to claim 9 wherein the molar ratio of the reaction product (a2) to the secondary amine (a1) is between 0.3 and 30.

16. The method according to claim 9 further contains at least one catalyst.

\* \* \* \* \*